(12) United States Patent
Gueret et al.

(10) Patent No.: US 12,530,534 B2
(45) Date of Patent: Jan. 20, 2026

(54) SYSTEM AND METHOD FOR GENERATING STRUCTURED SEMANTIC ANNOTATIONS FROM UNSTRUCTURED DOCUMENT

(71) Applicant: Accenture Global Solutions Limited, Dublin (IE)

(72) Inventors: Christophe Gueret, Donabate (IE); Nicoleta Melinda Mindruta, Blackrock (IE); Koustav Ghosal, Dublin (IE)

(73) Assignee: ACCENTURE GLOBAL SOLUTIONS LIMITED, Chandler, AZ (US)

( * ) Notice: Subject to any disclaimer, the term of this patent is extended or adjusted under 35 U.S.C. 154(b) by 417 days.

(21) Appl. No.: 18/092,987

(22) Filed: Jan. 4, 2023

(65) Prior Publication Data
US 2024/0220725 A1    Jul. 4, 2024

(51) Int. Cl.
*G06F 40/30*    (2020.01)
*G06F 40/40*    (2020.01)
(Continued)

(52) U.S. Cl.
CPC .............. *G06F 40/30* (2020.01); *G06F 40/40* (2020.01); *G06N 5/025* (2013.01); *G06F 16/30* (2019.01)

(58) Field of Classification Search
CPC ........ G06F 40/30; G06F 40/40; G06F 40/169; G05F 40/295; G06N 5/022; G06N 5/025
See application file for complete search history.

(56) References Cited

U.S. PATENT DOCUMENTS 5,309,359 A * 5/1994 Katz ................. G06F 40/169
707/999.102
7,640,254 B2 * 12/2009 McConnell ....... G06F 16/24522
(Continued)

FOREIGN PATENT DOCUMENTS

EP    3089052 A1 * 11/2016  ........... G06F 16/358
EP    3553696 A1 * 10/2019  ............. G06V 20/20

OTHER PUBLICATIONS

Liu, Yinhan, et al. "Roberta: A robustly optimized bert pretraining approach." arXiv preprint arXiv:1907.11692 (Year: 2019).*
(Continued)

*Primary Examiner* — Pierre Louis Desir
*Assistant Examiner* — Sean Thomas Smith
(74) *Attorney, Agent, or Firm* — Mannava & Kang, P.C.

(57) ABSTRACT

A method and system for generating structured semantic annotations from unstructured documents are disclosed. The method may include obtaining a natural language processing model trained to extract unstructured data from an unstructured document and output structured data based on a generic document ontology. The method may further include inputting a plurality of unstructured documents into the natural language processing model to obtain generic structured annotations of the unstructured documents. The method may further include aligning the generic structured annotations to a target ontology specifying a use case to generate target structured annotations for the use case. The target structured annotations may include entities and relations between the entities. The method may further include generating a knowledge representation for the use case based on the target structured annotations and generic structured annotations.

15 Claims, 6 Drawing Sheets

(51) Int. Cl.
*G06N 5/025* (2023.01)
*G06F 16/30* (2019.01)

(56) References Cited

U.S. PATENT DOCUMENTS

| | | | | |
|---|---|---|---|---|
| 8,706,491 | B2* | 4/2014 | Chelba | G06F 40/205 |
| | | | | 704/231 |
| 9,348,815 | B1* | 5/2016 | Estes | G06F 40/40 |
| 9,697,192 | B1* | 7/2017 | Estes | G06Q 10/107 |
| 9,760,554 | B2* | 9/2017 | Fink | G06F 40/169 |
| 9,779,075 | B2* | 10/2017 | Bhatt | G06F 16/955 |
| 10,002,325 | B2* | 6/2018 | Sweeney | G06N 7/01 |
| 10,997,223 | B1* | 5/2021 | Christodoulopoulos | |
| | | | | G06F 40/295 |
| 12,190,057 | B2* | 1/2025 | Wendell | G06F 40/247 |
| 2010/0185700 | A1* | 7/2010 | Bodain | H04L 67/02 |
| | | | | 707/E17.044 |
| 2011/0295853 | A1* | 12/2011 | Li | G06F 16/313 |
| | | | | 707/769 |
| 2016/0335544 | A1* | 11/2016 | Bretschneider | G06F 16/367 |
| 2017/0046425 | A1* | 2/2017 | Tonkin | G06F 16/3344 |
| 2019/0005012 | A1* | 1/2019 | Priestas | G06N 20/00 |
| 2019/0065453 | A1* | 2/2019 | Bulgakov | G06F 40/211 |
| 2022/0138572 | A1* | 5/2022 | Song | G06F 40/30 |
| | | | | 706/20 |
| 2022/0156300 | A1* | 5/2022 | Paruchuri | G06N 3/08 |
| 2022/0164683 | A1* | 5/2022 | Hao | G06N 3/044 |
| 2022/0188895 | A1* | 6/2022 | Lipka | G06N 5/04 |
| 2022/0253594 | A1* | 8/2022 | Potts | G06F 3/04842 |
| 2023/0031202 | A1* | 2/2023 | Abelha | G06V 30/412 |
| 2023/0076127 | A1* | 3/2023 | Yu | G06F 21/577 |
| 2024/0005096 | A1* | 1/2024 | Balasubramanian | G06N 5/022 |
| 2024/0202447 | A1* | 6/2024 | Rossiello | G06F 40/295 |

OTHER PUBLICATIONS

Ebeid, I. "Knowledge graph mining: a survey of methods, approaches, and applications." (Year: 2020).*
Yu, Kaige, et al. "Entity embedding and relational path on small samples for knowledge graph completion." Third International Conference on Artificial Intelligence and Computer Engineering (ICAICE 2022). vol. 12610. SPIE, 2023. (Year: 2022).*
Liu, Yinhan, et al. "Roberta: A robustly optimized bert pretraining approach." arXiv preprint arXiv:1907.11692 (2019). (Year: 2019).*
Ebeid, I. "Knowledge graph mining: a survey of methods, approaches, and applications." 2020. (Year: 2020).*
Yu, Kaige, et al. "Entity embedding and relational path on small samples for knowledge graph completion." Third International Conference on Artificial Intelligence and Computer Engineering (ICAICE 2022). vol. 12610. SPIE, 2023. (Year: 2023).*

* cited by examiner

SYSTEM AND METHOD FOR GENERATING STRUCTURED SEMANTIC ANNOTATIONS FROM UNSTRUCTURED DOCUMENT

TECHNICAL FIELD

This disclosure relates to natural language processing, in particular, to utilizing machine learning based natural language processing model to generate structured semantic annotations from unstructured documents.

BACKGROUND

Natural language processing is concerned with the interactions between machines and human language. One of the challenges in natural language processing is natural-language understanding, for example, deciphering key information such as entities and their relations from the text in unstructured documents such as press releases. It is more challenging to explore a common natural language processing framework to align the deciphered key information to a variety of customized ontologies for different use cases.

SUMMARY

This disclosure relates to systems and methods for generating structured semantic annotations from unstructured documents using machine learning based natural language processing model.

In one embodiment, a method for generating structured semantic annotations is disclosed. The method may be performed by a processor circuitry. The method may include obtaining a natural language processing model trained to extract unstructured data from an unstructured document and output structured data based on a generic document ontology. The method may further include inputting a plurality of unstructured documents into the natural language processing model to obtain generic structured annotations of the unstructured documents. The method may further include aligning the generic structured annotations to a target ontology specifying a use case to generate target structured annotations for the use case. The target structured annotations may include entities and relations between the entities. The method may further include generating a knowledge representation for the use case based on the target structured annotations and generic structured annotations.

In another embodiment, a system for generating structured semantic annotations is disclosed. The system may include a memory having stored thereon executable instructions and a processor circuitry in communication with the memory. When executing the instructions, the processor circuitry may be configured to obtain a natural language processing model trained to extract unstructured data from an unstructured document and output structured data based on a generic document ontology. The processor circuitry may be further configured to input a plurality of unstructured documents into the natural language processing model to obtain generic structured annotations of the unstructured documents. The processor circuitry may be further configured to align the generic structured annotations to a target ontology specifying a use case to generate target structured annotations for the use case. The target structured annotations may include entities and relations between the entities. The processor circuitry may be further configured to generate a knowledge representation for the use case based on the target structured annotations and generic structured annotations.

In another embodiment, a product for generating structured semantic annotations is disclosed. The product may include non-transitory machine-readable media and instructions stored on the machine-readable media. When being executed, the instructions may be configured to cause a processor to obtain a natural language processing model trained to extract unstructured data from an unstructured document and output structured data based on a generic document ontology and input a plurality of unstructured documents into the natural language processing model to obtain generic structured annotations of the unstructured documents. The instructions may be further configured to cause the processor to align the generic structured annotations to a target ontology specifying a use case to generate target structured annotations for the use case. The target structured annotations may include entities and relations between the entities. The instructions may be further configured to generate a knowledge representation for the use case based on the target structured annotations and generic structured annotations.

Knowledge extraction typically depends on a particular use case. For example, the same schema may not work on both news about sports and medication. One interesting feature of the systems and methods for generating structured semantics annotations described below may be that it develops a knowledge extraction framework which is sufficiently generic to work on a variety of domains of documents such as news articles covering different topics such that the systems and methods may readily adapt to generate knowledge representations for different use cases. Specifically, the structured annotations for the knowledge representation may be generated with two steps. The first step is to generate generic structured annotations which are generic enough to cover multiple domains of knowledge. The second step is to align the generic structured annotations to the target ontology for a particular use case to generate the target structured annotations for the use case. In this way, the systems and methods may adapt to generate knowledge representations for other use cases by aligning the generic structured annotations to target ontologies for the other use cases.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in an embodiment" or "in an implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

To illustrate embodiments in the present disclosure, the systems and methods for generating structured semantic annotations may be implemented to process an exemplary use case of holiday planning based on unstructured data such as the information published on the world wide web. In this exemplary context, the unstructured data may refer to the freely available data on the web, including textual data from news articles, blog posts, and the like, which do not conform to a standard semantic schema such as DBpedia or Schema.org. The systems and methods may extract key concepts from each of web documents on a number of web sites related to the use case in the form of structured data. Structured data refers to the data which is organized following a pre-defined schema. Then the systems and methods may collate the structured data into a bigger dataset matching a target ontology. The target ontology may include elements specific to the holiday planning. An ontology may refer to an explicit formal specification of the terms in the domain of interest with respect to the users' needs and relations among them. The ontology may define classes of entities and relationships connecting the entities. In some cases, the target ontology may include elements that are not expected to be found in the web documents.

Figure 1:
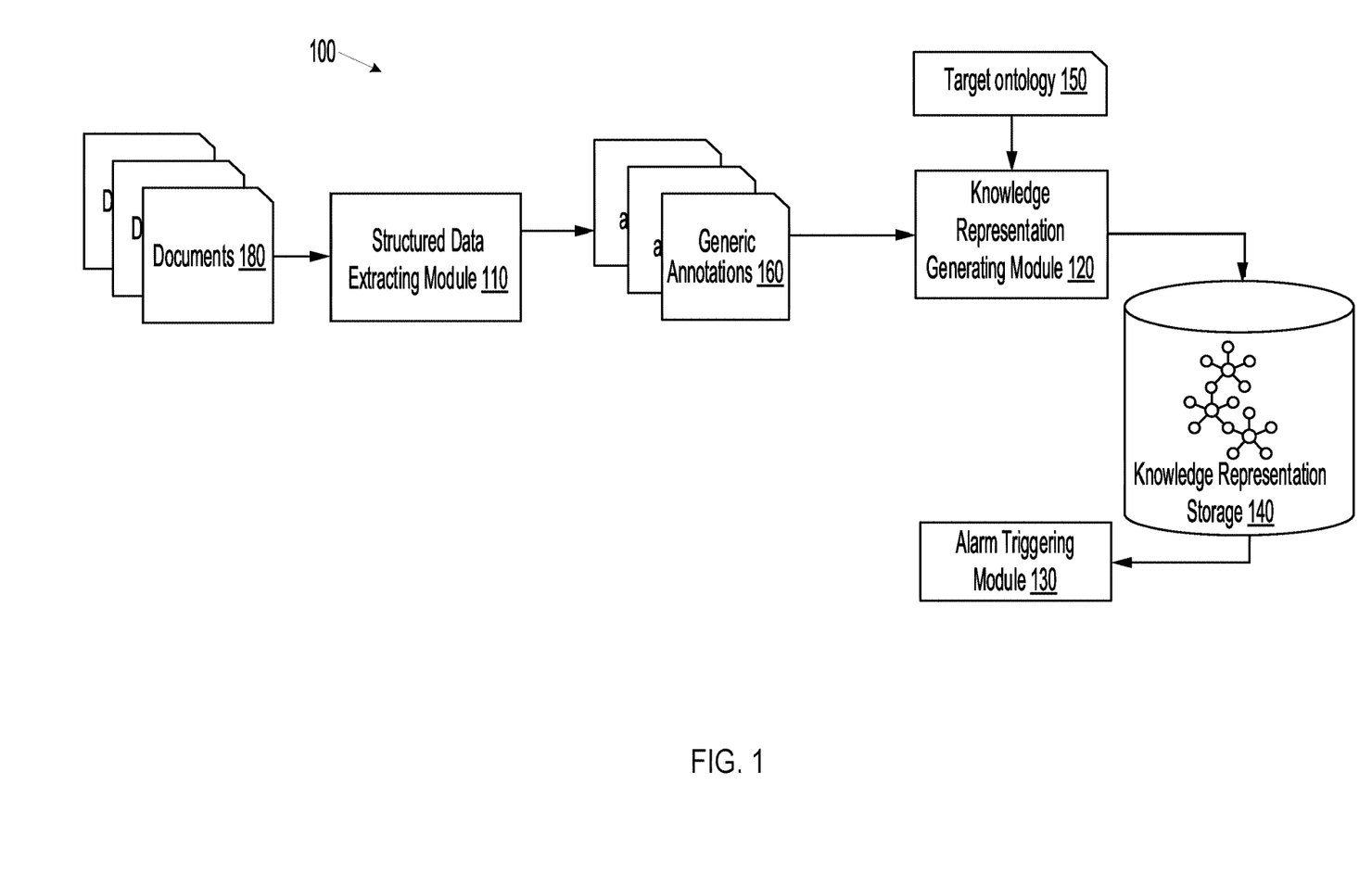
FIG. 1 shows an exemplary system for generating structured semantic annotations.

FIG. 1 shows exemplary architecture 100 for generating structured semantic annotations for unstructured documents. Here, the embodiments of the present disclosure are discussed with the web page documents as exemplary unstructured documents. It should be appreciated that the systems and methods in the present disclosure may be used to generate structured semantic annotations for other applicable unstructured documents. The architecture 100 may include structured data extracting module 110, knowledge representation generating module 120, and alarm triggering module 130. The modules may operate collaboratively to implement structured semantic annotation generation as discussed in the present disclosure.

Herein, the term module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the unit. A module is configured to perform functions and achieve goals such as those described in this disclosure, and may work together with other related modules, programs, and components to achieve those functions and goals.

Figure 2:
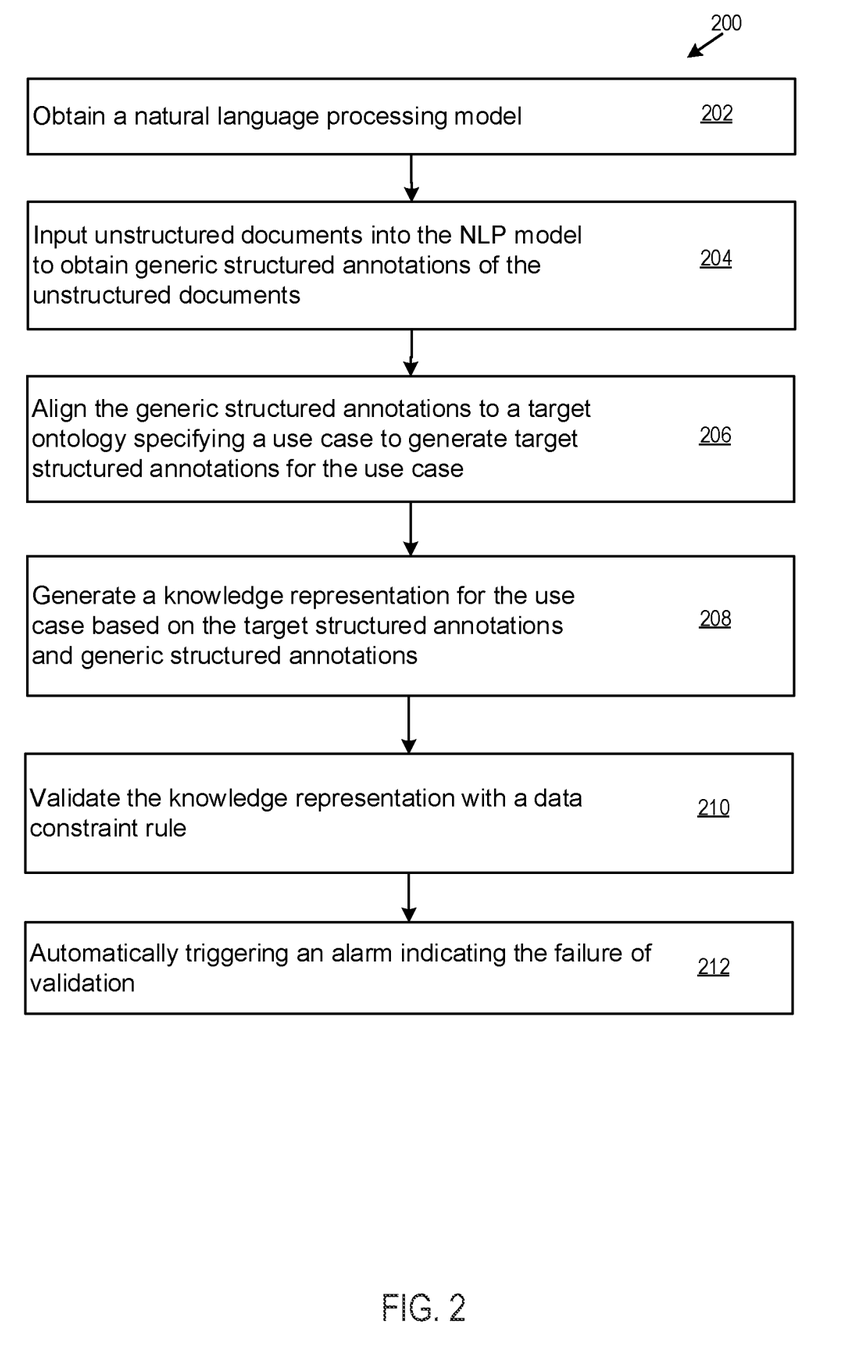
FIG. 2 shows an exemplary logic for generating structured semantic annotations.

FIG. 2 shows an exemplary structured semantic annotation generation logic (SSAGL) 200. The logical features of the SSAGL 200 may be implemented in various orders and combinations. For example, in a first implementation, one or more features may be omitted or reordered with respect to a second implementation. The logical features will be discussed with reference to the modules in FIG. 1.

At the structured data extracting modules 110, the SSAGL 200 may obtain a natural language processing (NLP) model trained to extract unstructured data from an unstructured document and output structured data based on a generic document ontology (202). In an implementation, the SSAGL 200 may obtain the NLP model by training a machine learning model such as a transformer. The transformer is a type of neural network capable of processing sequential data efficiently. With attention mechanism, the transformer may learn generic latent representations of the input data. These latent embeddings may subsequently be fine-tuned for diverse downstream tasks. The transformer has been applied in NLP to develop large language models achieving significant improvements over the state-of-the-art in tasks such as machine translation, sentence completion, etc. The process of training the transformer will be discussed later. The generic document ontology may define a set of basic entities such as Person and Location expected to be described in various kinds of web page documents. In an example, the Schema.org ontology is used as the generic document ontology.

Then, the SSAGL 200 may input a plurality of unstructured documents 180 into the NLP model to obtain generic structured annotations 160 of the unstructured documents (204). The plurality of unstructured documents may be related to a specific use case. In the use case of holiday planning, the unstructured documents may include web page documents containing holiday event information from venue web sites, web page documents containing ticket information from an online ticketing system, and web page documents containing medical guidelines from web sites of the city or country where the venues of the events are located. The generic structured annotations may represent the structured data extracted from the unstructured documents in form of entities and relations between the entities as defined in the generic document ontology. The structured annotations may also be referred to as graph annotations or sub-graphs, which are used interchangeably in the present disclosure. As the NLP model is trained based on the generic document ontology defining a set of basic entities, the extracted structured annotations would be generic enough to describe various kinds of web pages covering different topics.

In an implementation, the SSAGL 200 may tokenize the raw text from web page documents such as news articles or blogs into tokenized vectors and use the tokenized vectors as the input of the NLP model. The input may be purely textual modality and the vocabulary may be constructed of English words as done typically in large language modelling. The structured annotations outputted by the NLP model may also have tokenized representations, which are generated using a vocabulary constructed from the convention used in standards such as Schema.org. Therefore, the modality of the output tokens is in a structured format and different from the modality of the input tokens which is in an unstructured format.

Table 1 illustrates an exemplary representation of the generic structured annotations extracted from an unstructured document. As shown in Table 1, the director information in the unstructured document is extracted as the entity Person by the NLP model. In an implementation, the structured annotations may be stored in a table data structure.

TABLE 1

Exemplary generic structured annotations

```
<div itemscope itemtype ="https://schema.org/Movie">
    <h1 itemprop="name">Avatar</h1>
    <div itemprop="director" itemscope
    itemtype="https://schema.org/Person">
    Director: <span itemprop="name">James Cameron</span> (born
<span itemprop="birthDate">August 16, 1954</span>)
    </div>
    <span itemprop="genre">Science fiction</span>
    <a href="../movies/avatar-theatrical-trailer.html"
    itemprop="trailer">Trailer</a>
</div>
```

Figure 3:
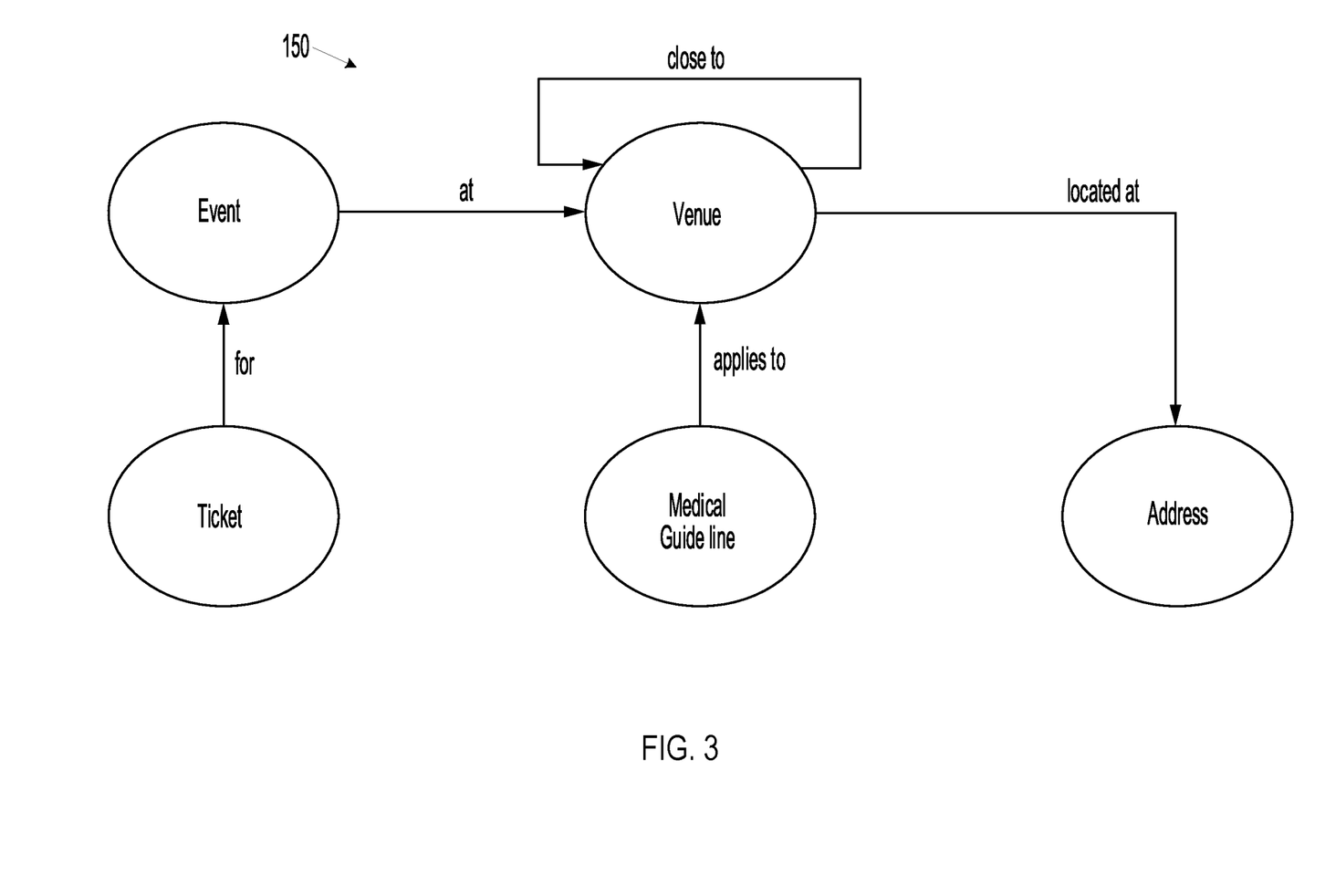
FIG. 3 shows an exemplary target ontology.
Figure 4:
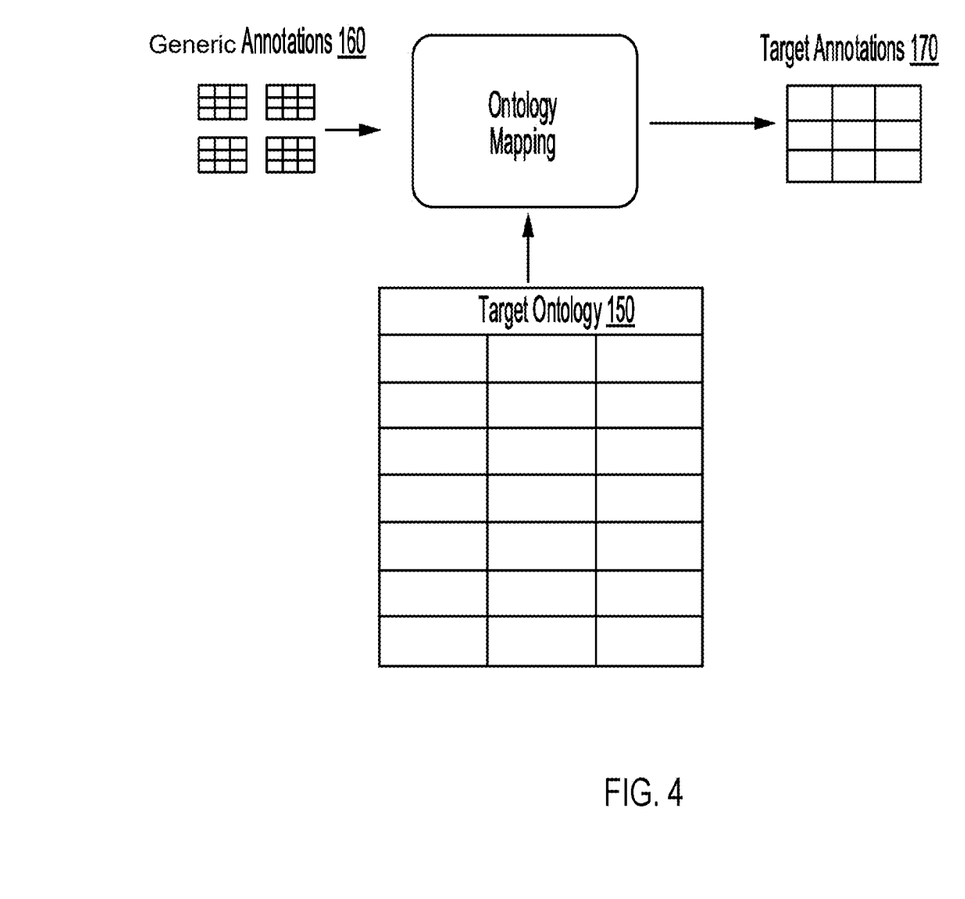
FIG. 4 shows an exemplary process of aligning generic annotations to a target ontology.

At the knowledge representation generating module 120, the SSAGL 200 may align the generic structured annotations to a target ontology specifying a use case to generate target structured annotations for the use case (206). The target structured annotations may include entities and relations connecting the entities as defined in the target ontology. FIG. 3 illustrates a target ontology 150 for the use case of holiday planning, which focuses on events and the safety of the events. As shown in FIG. 3, the target ontology 150 defines the entities Event, Venue, Ticket, Medical Guideline, and Address. The target ontology 150 also defines the relations between the entities such as close_to, located_at, applies_to, for, and at. In an implementation as shown in FIG. 4, the SSAGL 200 may utilize the target ontology 150 to map generic structured annotations 150 extracted from each of the plurality of unstructured documents 180 to generate the target annotations 170 matching the target ontology 150.

After generating target structured annotations, the SSAGL 200 may generate a knowledge representation for the use case based on the target structured annotations and generic structured annotations (208). The knowledge representation may integrate structured data from different domains and be implemented as a knowledge graph, a resource description framework (RDF), or a labelled property graph (LPG). Taking the knowledge graph as an example, the knowledge graph dataset includes directed, label edges that connect nodes representing entities. Two nodes in the knowledge graph can be connected by multiple edges with distinct labels. Therefore, the knowledge graph is a multi-relational graph.

In an implementation, the SSAGL 200 may map the entities and relations in the target structured annotations to the nodes and edges in the knowledge graph respectively. However, in some cases, the knowledge graph needs to be further tuned to adapt to the use case. For example, a portion of the entities or relations defined in the target ontology may not be identified in the target annotations because, for example, they are not explicitly described in the unstructured documents or are not present in the target ontology. As a result, these entities or relations may not be generated in the knowledge graph by simply mapping the entities and relations in the target structured annotations to the nodes and edges in the knowledge graph. In this case, the SSAGL 200 may derive additional entities or relations missing in the target structured annotations based on the generic structured annotations.

In some cases, the relation "close_to" is absent from the parsed web page documents, and thus the Venue entities in the target structured annotations do not have the "close_to" relation therebetween. The SSAGL 200 may generate the "close_to" relation between two "Venue" entities in the target structured annotations for the knowledge representation based on a semantic reasoning rule. The semantic reasoning rule may, for example, specify that the "close_to" relation of two Venue entities is established if the geographical distance between the two Venues is less than two kilometers.

In some cases, an implicit entity may arise from a chain of statements that are not described in the target ontology but lead to a relevant relation between two entities present in the target ontology via the implicit entity. For example, a Covid-Vaccination policy is applied in Ireland, <covid-vaccination; for_country; ireland>, and venue_A is located in Ireland, <venue_A; located_in; ireland>, which would lead to the "applies_to" relation between the entity Medical Guideline and the entity Venue via the implicit entity Country, <covid-vaccination; applies_to; venue_A>. As the target ontology does not have the concept of entity for Country, the target structured annotations would not include the "applies_to" relation between the Medical Guideline entity and the Venue entity.

To address the issue of implicitly entities, the SSAGL 200 may determine an implicit entity not in the target structured annotations but in the generic structured annotations based on the entities present in the target structured annotations. For example, the implicit entity may have specific relations with two entities in the target structured annotations. Then, the SSAGL 200 may generate a relation between the two entities for the knowledge representation based on the implicit entity. The relation between the two entities are not in the target structured annotations. For example, the SSAGL 200 may calculate path metrics for the two entities in the generic structured annotations and determine the implicit entity based on the path metrics. The path metrics may include a number of relation paths between the two entities in the generic structured annotations, a shortest relation path length between the two entities in the generic structured annotations, or an average path length of the relation paths between the two entities.

In an example, the SSAGL 200 may traverse the entities and relations in the generic structured annotations to search for a number of shortest paths connecting two entities present in the target structured annotations such as Medical Guideline and Venue. The SSAGL 200 may infer a score, for example, between 0 and 1 for the likelihood that an implicit entity is present in the shortest paths. The score may be calculated based on the path metrics. For example, paths that are uncommonly short and occur very frequently may have higher score. When the score of a path is higher than a predetermined threshold, the SSAGL 200 may determine that an implicit entity exists in the path. In this way, an indirect relation between the two entities may be identified via the implicit entity.

In some cases, the target structured annotations may include several instances of the same entity and only one of them is expected to be selected for the knowledge representation. For example, a concert "concert_A" is found to take place at two venues, "venue_A" and "venue_B" in the generic structured annotations. In the holiday plan use case, there is no need to attend the concert at two venues and only one venue needs to be kept.

In an implementation, the SSAGL 200 may select a target entity for the knowledge representation from candidate entities in the target structured annotations based on attributes of the candidate entities. The attributes of the entities may include, for example, the amount of information of the entity and the degree centrality of the entity. For instance, the SSAGL 200 may select the Venue entity having more information regarding the venue as the target entity for the knowledge representation. Alternatively, or additionally, the SSAGL 200 may select the Venue entity with higher degree centrality in the target structured annotations as the target entity for the knowledge representation.

In another implementation, the SSAGL 200 may select a target entity from candidate entities in the target structured annotations based on a specified preference on the entities. For example, the specified preference is the accessibility for the disabled. The SSAGL 200 may select the entity with the disabled access as the target entity.

Referring back to FIG. 1, with the SSAGL 200, the data from different domains may be extracted and integrated into the knowledge representation for a specific use case, which may facilitate the downstream applications. In an implementation, the knowledge representation may be stored in the knowledge representation storage 140 such as cloud storage, relational database, flat files, and other data operations.

After generating the knowledge representation, at the alarm triggering module 130, the SSAGL 200 may validate the knowledge representation with a data constraint rule (210). Where the knowledge representation fails to meet the data constraint rule, the SSAGL 200 may automatically trigger an alarm indicating the failure (212). The data constraint rule may be defined, for example, using Shapes Constraint Language (SHACL). SHACL is a World Wide Web Consortium (W3C) standard for validating the contents of the knowledge representation such as the RDF graph. The data constraint rule may be defined independently of the target ontology. In an implementation, the data constraint rule may be defined in a constraint validation sub-system of a knowledge graph database implementing SHACL. The validation sub-system may facilitate to trigger the alarm in response to a failure to meet the data constraint rule. For example, the data constraint rule specifies that there should not be any Medical Guideline related to a Venue of interest. If a link is present between the Medical Guideline and the Venue in the Knowledge representation, an alarm will be triggered based on the data constraint rule. In an example, the alarm may take the form of message displayed on the user interface of the user device.

Figure 5:
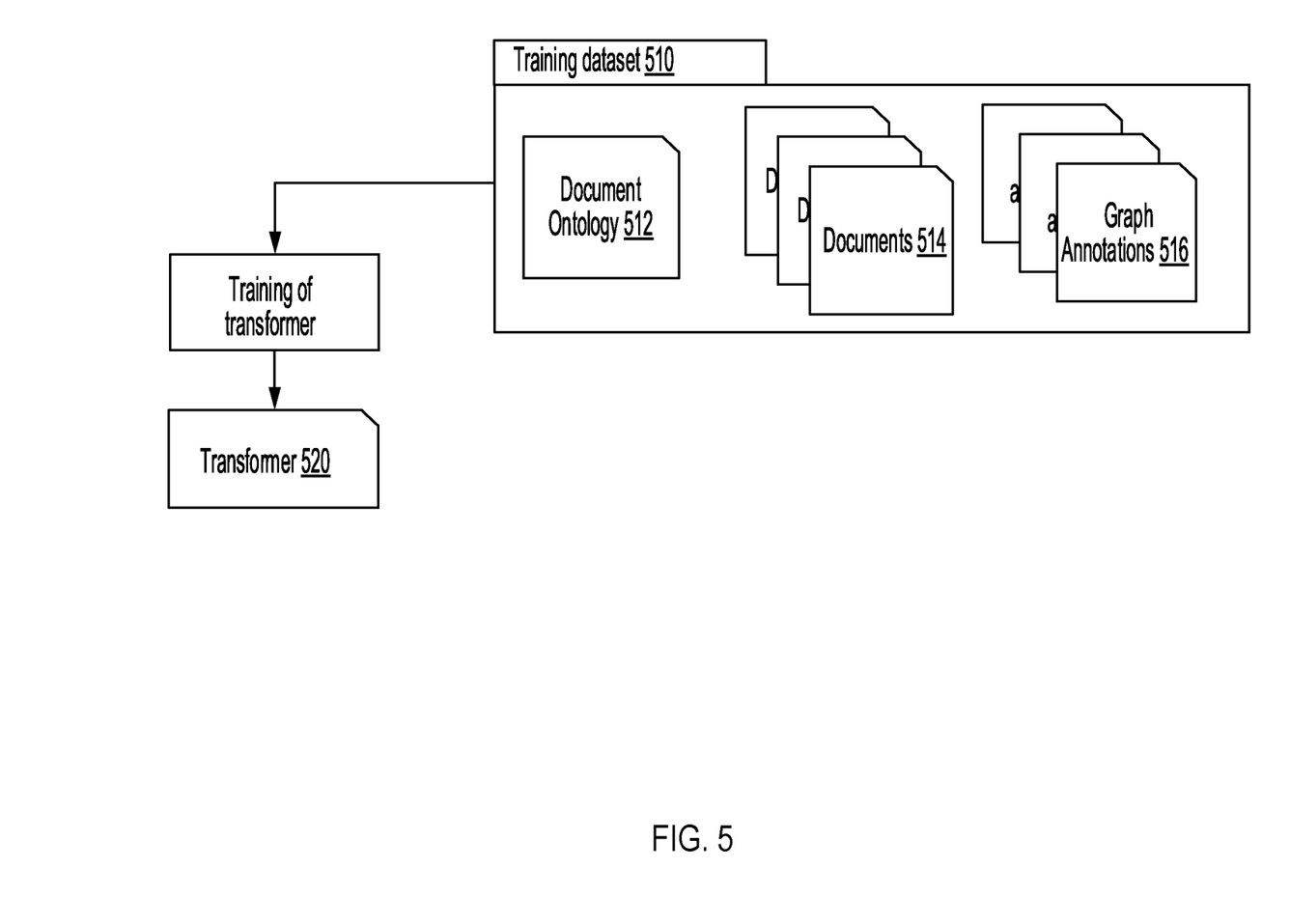
FIG. 5 shows an exemplary process of training a natural language processing model.

Now an exemplary process of training a transformer 520 will be discussed with reference to FIG. 5. The SSAGL 200 may obtain training dataset 510 for the transformer 520. The dataset 510 may include the generic document ontology 512, unstructured documents 514, annotated documents 516 including structured semantic annotations for the unstructured documents. In an example, the generic document ontology 512 is the Schema.org which identifies elements of web page documents worthy of indexing by search engines. The annotated documents 516 may be represented by the data dump Web Data Commons, which extracts structured data from the Common Crawl, the largest web corpus available to the public. The unstructured documents 514 may be derived from Web Data Commons by removing the annotations from the documents. Then, the SSAGL 200 may train a deep learning model such as a neural network with the training dataset to obtain the transformer 520. With the generic training dataset covering various domains of web page documents, the deep learning model may perform self-supervised learning, which refers to the paradigm of training neural network without curated manual supervision in the form of labelled data. For example, for the sentence completion task in NLP, the transformer is trained to predict a masked version of the input data and thereby learn the underlying data distribution. No additional labelling is necessary for the training.

In an exemplary training implementation, the SSAGL 200 may input a tokenized sequence of two structured annotations into the deep learning model. The two structured annotations may be an actual sequence of structured annotations in the annotated documents of the training dataset. Alternatively, or additionally, the two structured annotations may be randomly sampled from the annotated documents of the training dataset. To train the deep learning model to learn the semantics of structured data, some sections of the structured annotations may be masked before being input into the learning model and the learning model is trained to predict the masked sections based on its previous learning. For example, the structured annotation <h1 itemprop="name"> Avatar </h1> may be masked as <h1 itemprop="[MASK]"> Avatar </[MASK]>. Such training may help the learning model to under the "local" or word-level correlation and context in natural language.

The deep learning model may further be trained with an additional loss function called next sentence prediction loss. For example, two structured annotations are passed to the learning model and the learning model is trained to predict whether these two structured annotations are sequentially sampled from the same annotated document or randomly sampled from different annotated documents. The model may predict a 0 or 1, where 0 may represent sequentially sampling and 1 may represent randomly sampling. This training may enable the learning model to understand the "global" or sentence-level context in natural language.

The loss function $\mathcal{L}$ of the training can be represented with the equation:

$$\mathcal{L} = \mathcal{L}_{mask} + \mathcal{L}_{sampling}$$

Where $\mathcal{L}_{mask}$ is the cross entropy loss attributed to the mask prediction and $\mathcal{L}_{sampling}$ is the loss for the structured annotation sampling classification.

Figure 6:
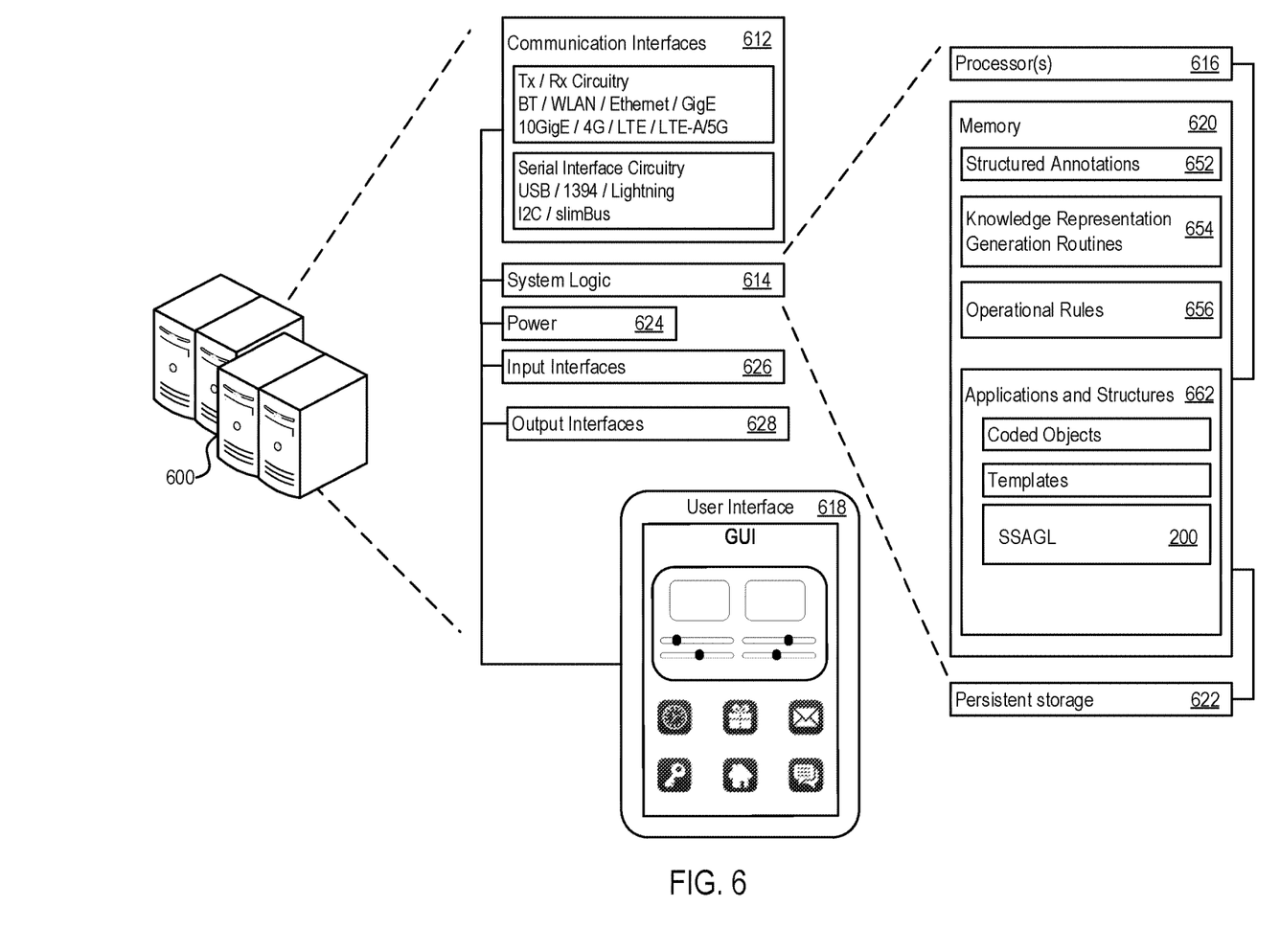
FIG. 6 shows an exemplary specific execution environment for executing the logic for generating structured semantic annotations.

FIG. 6 shows an exemplary specific execution environment for executing the SSAGL 200 as described above. The execution environment 600 may include system logic 614 to support execution of the SSAGL 200 described above. The system logic 614 may include processors 616, memory 620, and/or other circuitry. The memory 620 may include structured annotations 652, knowledge representation generation routines 654, and operational rules 656. The memory 620 may further include applications and structures 662, for example, coded objects, machine instructions, templates, or other structures to support obtaining generic structured annotations, aligning the generic structured annotations to a target ontology, generating knowledge representation, or other tasks described above. The applications and structures may implement the SSAGL 200.

The execution environment 600 may also include communication interfaces 612, which may support wireless, e.g. Bluetooth, Wi-Fi, WLAN, cellular (4G, LTE/A, 5G), and/or wired, Ethernet, Gigabit Ethernet, optical networking protocols. The communication interfaces 612 may also include serial interfaces, such as universal serial bus (USB), serial ATA, IEEE 1394, lighting port, I²C, slimBus, or other serial interfaces. The execution environment 600 may include power functions 624 and various input interfaces 626. The execution environment may also include a user interface 618 that may include human-to-machine interface devices and/or graphical user interfaces (GUI). In some implementations, the system logic 614 may be distributed over one or more physical machines or be implemented as one or more virtual machines.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CD-ROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

What is claimed is:

1. A method comprising:
   obtaining, with a processor circuitry, a natural language processing model trained to extract unstructured data from an unstructured document and output structured data based on a generic document ontology by,
      obtaining a training dataset including a generic document ontology and annotated documents including structured semantic annotations for the unstructured document,
      training a deep learning model with the training dataset, wherein the deep learning model is trained with the training dataset by sampling structured semantic annotations from the annotated documents, sections of the structured semantic annotations being masked, wherein the deep learning model is a neural network model,
      predicting, with the deep learning model, whether the sampled structured semantic annotations are randomly sampled or sequentially sampled, wherein the deep learning model predicts a binary number that represents at least one the sequentially sampled or the random sampled of the sampled structured semantic annotations; and
      predicting, with the deep learning model, the masked sections based on the sampled structured semantic annotations;
   inputting, with the processor circuitry, a plurality of unstructured documents into the natural language processing model to obtain generic structured annotations of the unstructured documents;
   aligning, with the processor circuitry, the generic structured annotations to a target ontology specifying a use case to generate target structured annotations for the use case, the target structured annotations comprising entities and relations between the entities;
   generating, with the processor circuitry, a knowledge representation for the use case based on the target structured annotations and generic structured annotations; and
   validating the knowledge representation with a data constraint rule, and
   in response to the knowledge representation failing to meet the data constraint rule, automatically triggering an alarm indicating the failure, wherein the alarm in the form of message is displayed on a user interface of a user device.

2. The method of claim 1, wherein the generating the knowledge representation comprises:
selecting a target entity from candidate entities in the target structured annotations based on attributes of the candidate entities.

3. The method of claim 1, wherein the generating the knowledge representation comprises:
selecting a target entity from candidate entities in the target structured annotations based on a specified preference on the entities.

4. The method of claim 1, wherein the generating the knowledge representation comprises:
determining an implicit entity not in the target structured annotations but in the generic structured annotations, the implicit entity having relation with two entities in the target structured annotations; and
generating a relation between the two entities for the knowledge representation based on the implicit entity, the relation between the two entities being not in the target structured annotations.

5. The method of claim 4, wherein the determining the implicit entity comprises:
calculating path metrics for the two entities based on the generic structured annotations; and
determining the implicit entity based on the path metrics.

6. The method of claim 5, wherein the path metrics comprising a number of relation paths between the two entities in the generic structured annotations, a shortest relation path length between the two entities in the generic structured annotations, or an average path length of the relation paths between the two entities.

7. The method of claim 1, wherein the generating the knowledge representation comprises:
generating a relation between two entities in the target structured annotations for the knowledge representation based on a semantic reasoning rule, the relation between the two entities being not in the target structured annotations.

8. A system comprising:
a memory having stored thereon executable instructions;
a processor circuitry in communication with the memory, the processor circuitry when executing the instructions configured to:
obtain a natural language processing model trained to extract unstructured data from an unstructured document and output structured data based on a generic document ontology by,
obtaining a training dataset including a generic document ontology and annotated documents including structured semantic annotations for the unstructured document,
training a deep learning model with the training dataset, wherein the deep learning model is trained with the training dataset by sampling structured semantic annotations from the annotated documents, sections of the structured semantic annotations being masked, wherein the deep learning model is a neural network model,
predicting, with the deep learning model, whether the sampled structured semantic annotations are randomly sampled or sequentially sampled, wherein the deep learning model predicts a binary number that represents at least one the sequentially sampled or the random sampled of the sampled structured semantic annotations, and
predicting, with the deep learning model, the masked sections based on the sampled structured semantic annotations;
input a plurality of unstructured documents into the natural language processing model to obtain generic structured annotations of the unstructured documents;
align the generic structured annotations to a target ontology specifying a use case to generate target structured annotations for the use case, the target structured annotations comprising entities and relations between the entities; and
generate a knowledge representation for the use case based on the target structured annotations and generic structured annotations; and
validate the knowledge representation with a data constraint rule, and
in response to the knowledge representation failing to meet the data constraint rule, automatically triggering an alarm indicating the failure, wherein the alarm in the form of message is displayed on a user interface of a user device.

9. The system of claim 8, wherein the processor circuitry is configured to:
select a target entity from candidate entities in the target structured annotations based on attributes of the candidate entities.

10. The system of claim 8, wherein the processor circuitry is configured to:
select a target entity from candidate entities in the target structured annotations based on a specified preference on the entities.

11. The system of claim 8, wherein the processor circuitry is configured to:
determine an implicit entity not in the target structured annotations but in the generic structured annotations, the implicit entity having relation with two entities in the target structured annotations; and
generate a relation between the two entities for the knowledge representation based on the implicit entity, the relation between the two entities being not in the target structured annotations.

12. The system of claim 11, wherein the processor circuitry is configured to:
calculate path metrics for the two entities based on the generic structured annotations; and
determine the implicit entity based on the path metrics.

13. The system of claim 12, wherein the path metrics comprising a number of relation paths between the two entities in the generic structured annotations, a shortest relation path length between the two entities in the generic structured annotations, or an average path length of the relation paths between the two entities.

14. The system of claim 8, wherein the processor circuitry is configured to:
generate a relation between two entities in the target structured annotations for the knowledge representation based on a semantic reasoning rule, the relation between the two entities being not in the target structured annotations.

15. A product comprising:
non-transitory machine-readable media; and
instructions stored on the machine-readable media, the instructions configured to, when executed, cause a processor circuitry to:

obtain a natural language processing model trained to extract unstructured data from an unstructured document and output structured data based on a generic document ontology by,     obtaining a training dataset including a generic document ontology and annotated documents including structured semantic annotations for the unstructured document,     training a deep learning model with the training dataset, wherein the deep learning model is trained with the training dataset by sampling structured semantic annotations from the annotated documents, sections of the structured semantic annotations being masked, wherein the deep learning model is a neural network model,     predicting, with the deep learning model, whether the sampled structured semantic annotations are randomly sampled or sequentially sampled, wherein the deep learning model predicts a binary number that represents at least one the sequentially sampled or the random sampled of the sampled structured semantic annotations, and     predicting, with the deep learning model, the masked sections based on the sampled structured semantic annotations;

input a plurality of unstructured documents into the natural language processing model to obtain generic structured annotations of the unstructured documents;

align the generic structured annotations to a target ontology specifying a use case to generate target structured annotations for the use case, the target structured annotations comprising entities and relations between the entities;

generate a knowledge representation for the use case based on the target structured annotations and generic structured annotations; and validate the knowledge representation with a data constraint rule, and in response to the knowledge representation failing to meet the data constraint rule, automatically triggering an alarm indicating the failure, wherein the alarm in the form of message is displayed on a user interface of a user device.

\* \* \* \* \*